United States Patent [19]

Egger, Jr. et al.

[11] Patent Number: 5,581,957

[45] Date of Patent: Dec. 10, 1996

[54] COVED BACKSPLASH SYSTEM

[75] Inventors: Darris L. Egger, Jr., Huntington Beach; Ronald U. Pierotti, Mission Viejo, both of Calif.

[73] Assignee: Pacific Coast Installations, Inc., Paramount, Calif.

[21] Appl. No.: 174,789

[22] Filed: Dec. 29, 1993

[51] Int. Cl.$^6$ ................................................. A47B 96/18
[52] U.S. Cl. .............................. 52/35; 4/631; 312/140.4
[58] Field of Search .......................... 52/35, 287.1, 36.4; 4/520, 522, 631, 632, 633, 635, 656, 658; 312/140.3, 140.4

[56] References Cited

U.S. PATENT DOCUMENTS

| 3,101,486 | 8/1963 | Tiller | 52/35 X |
| 5,330,262 | 7/1994 | Peters | 4/631 X |

*Primary Examiner*—Carl D. Friedman
*Assistant Examiner*—Yvonne Horton-Richardson
*Attorney, Agent, or Firm*—Irving Keschner

[57] ABSTRACT

A system for forming a smooth, rounded inner corner joint between two adjacent perpendicular wall sections in a coved backsplash. The first wall section comprises a substantially rectangular member, the bottom surface thereof having a toe shaped protrusion, the sides of the protrusion extending at an angle to the longitudinal axis of the member. The second wall portion comprises a longitudinally extending wall portion comprising first and second steps, a curved lower portion of the second step extending outwardly from said first portion. A toe shaped protrusion being formed at the bottom of the second wall portion. A third right angled corner member has a first elongated surface which abuts against one edge of said first rectangular member and a second elongated thin edge portion which abuts against the riser portion between the first and second steps of the second wall portion, a toe shaped protrusion being at the bottom of the corner member. The toe shaped protrusions of said first and second wall portions and the corner member extend into mating recesses formed in the work surface upon which the coved backsplash is formed.

7 Claims, 3 Drawing Sheets

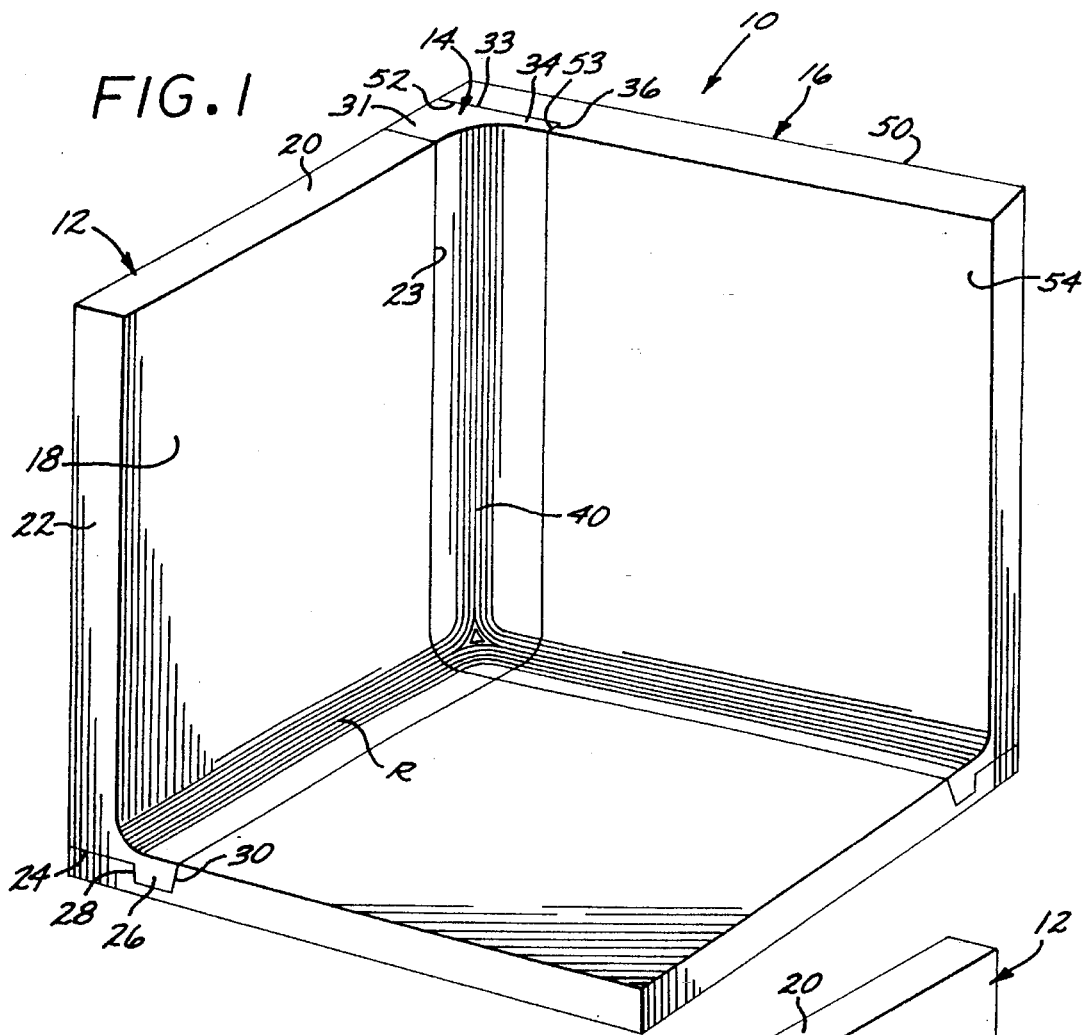
FIG. 1
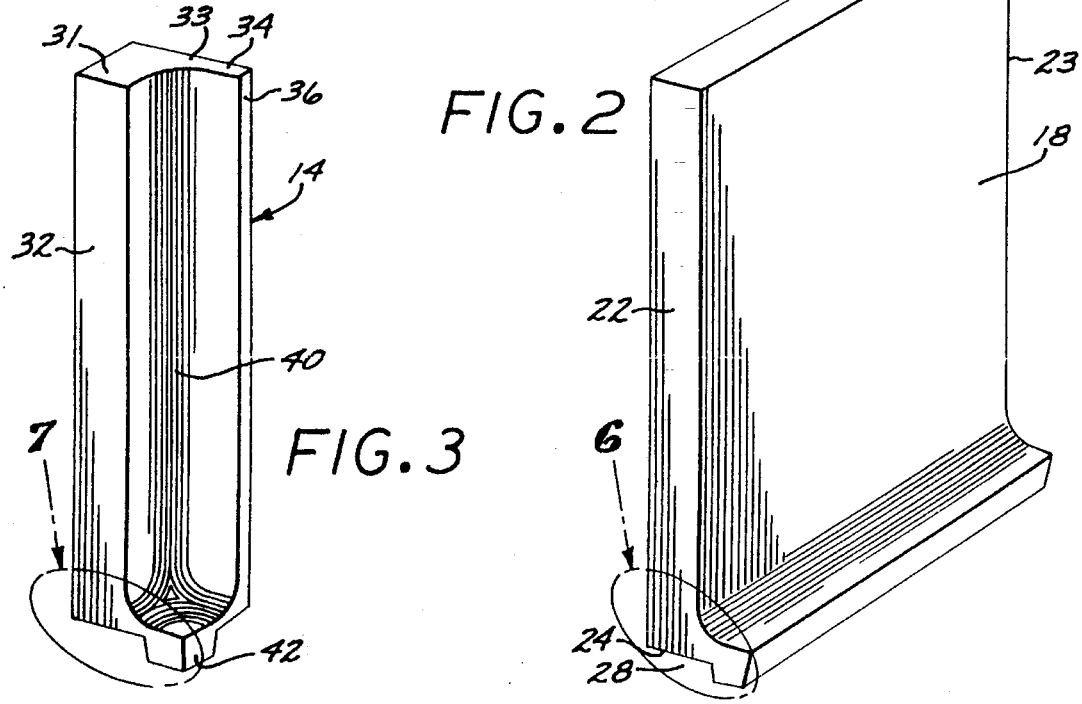
FIG. 2
FIG. 3

COVED BACKSPLASH SYSTEM

BACKGROUND OF THE INVENTION

1. Field of the Invention

An improved coved backsplash for countertops wherein an inside corner fitting is provided to enable a continuous smooth transition between adjacent vertical walls.

2. Description of the Prior Art

Typical kitchen countertops or decks utilize a backsplash to prevent water or other damage to adjacent walls. In addition, typical backsplashes are coved, or have a separate lower curved piece which provides an overall pleasing aesthetic effect. In order to provide a curved effect at the intersection of two adjacent backsplash portions, a separate coved piece is typically utilized. Further, in order to secure the backsplash portions to the deck portion of the counter, a pedestal type member is formed on the lower edge portion thereof and adapted to fit into a aligned recess. The joint is usually filled with an adhesive to secure the backsplash to the deck and blocks are provided to maintain the perpendicularity between the backsplash and the deck during the adhesive setting time.

A patentability search developed a member of patents which utilize separate components to form a smooth intersecting wall corner. In particular, U.S. Pat. No. 2,307,338 to Sluyter et al discloses an inside corner fitting comprising a pair of angularly disposed portions adapted to fit within such corner as illustrated and terminating at its lower end in a point; U.S. Pat. No. 1,794,158 to Dieterich discloses wall tiles having interfitting recessed portions; U.S. Pat. No. 3,707,061 to Collette et al discloses an inside molding having dowel pins and a plurality of spring clips for holding the molding in place; and U.S. Pat. No. 5,199,237 discloses the use of a receptacle to engage adjacent ends of adjacent lineal moldings.

What is desired is to provide a backsplash cove that is structurally stronger and more aesthetically pleasing that prior art designs and wherein the installation time and required equipment is reduced thereby reducing the installation costs.

SUMMARY OF THE PRESENT INVENTION

The present invention provides a system for forming a smooth, rounded inner corner joint between two adjacent perpendicular wall sections in a coved backsplash. The first wall section comprises a substantially rectangular member, the bottom surface thereof having a toe shaped protrusion, the sides of the protrusion extending at an angle to the longitudinal axis of the member. The second wall portion comprises a longitudinally extending wall portion comprising first and second steps, a curved lower portion of the second step extending outwardly from said first step portion. A toe shaped protrusion is formed at the bottom of said second wall portion. A third right angled corner member has a first elongated surface which abuts against one edge of said first rectangular member and a second elongated thin edge portion which abuts against the riser portion between the first and second steps of the second wall portion. A toe shaped protrusion is formed at the bottom of the corner member. The toe shaped protrusions of said first and second wall sections and the corner member extend into mating recesses formed in the horizontal work surface. The vertical seams, after the components are assembled, are almost invisible.

The present invention thus provides a backsplash cove that is structurally stronger and more aesthetically pleasing than prior art designs and wherein the installation time required is substantially reduced, thus reducing the installation cost.

DESCRIPTION OF THE DRAWING

For a better understanding of the invention as well as other objects and further features thereof, reference is made to the following description which is to be read in conjunction with the accompanying drawing wherein:

FIG. 1 is a perspective view illustrating the assembled coved backsplash system of the present invention;

FIG. 2 is a perspective view of the first wall section of the coved backsplash system of the present invention;

FIG. 3 is a perspective view of the corner piece utilized in the coved backsplash of the present invention;

DESCRIPTION OF THE PRESENT INVENTION

Figure 4:
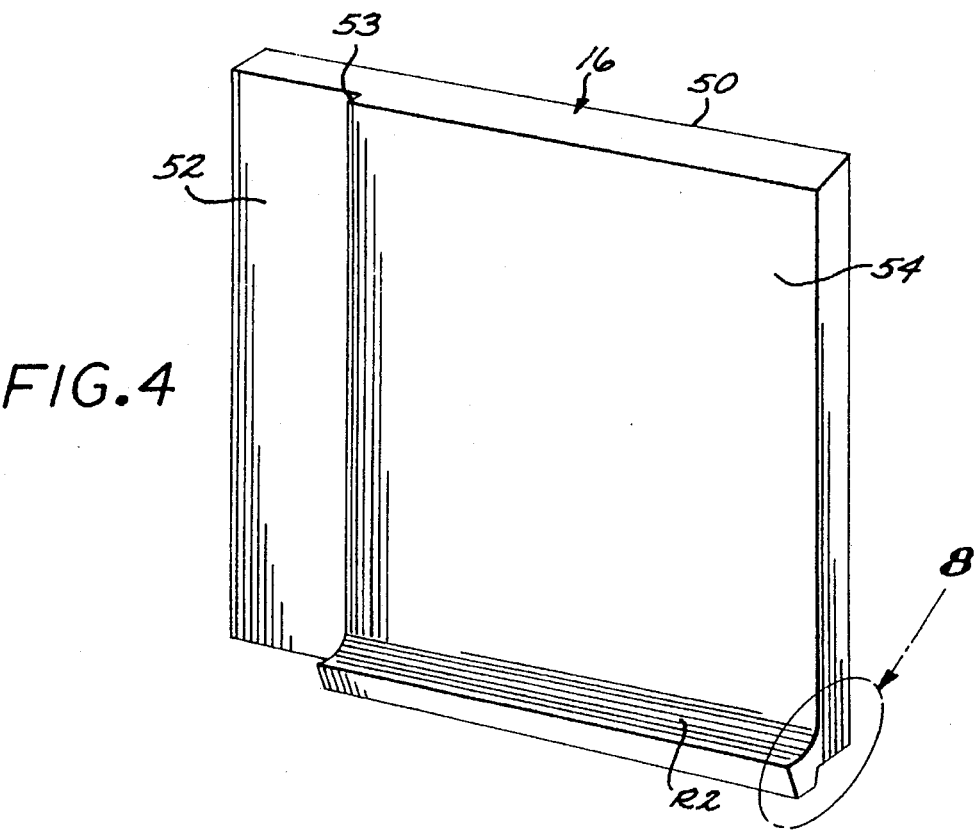
FIG. 4 is a perspective view of the second wall section of the coved backsplash system of the present invention.

Referring now to FIG. 1, a perspective view of the assembled coved backsplash system 10 of the present invention is illustrated. System 10 comprises three basic components: a first vertically extending wall section 12, a second inner fitting, or corner piece, 14 and a second vertically extending wall section 16.

Section 12, as shown in more detail in FIG. 2, comprises a longitudinally extending surface 18, edge portion 20 and side portion 22, side portion 22 being substantially at a right angle to edge portion 20.

The bottom area of section 12 comprises a horizontally extending edge portion 24 and a "toe" portion 26 which extends beyond the thickness of section 12 as illustrated.

Figure 6:
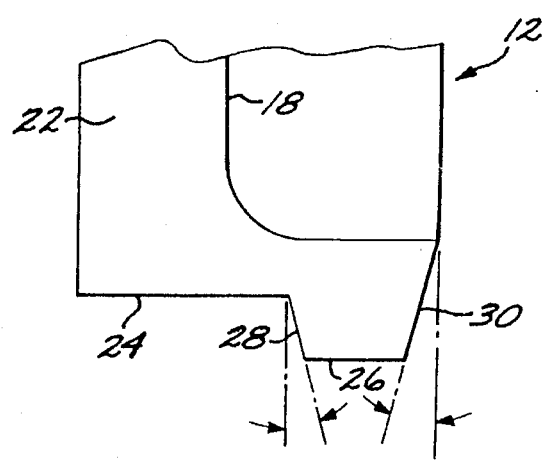
FIG. 6 is a detail of the bottom member of wall section 12.

Edge portion 24 intersects rear surface 28 of toe portion 26 at a predetermined angle $\alpha$, typically 15°, and front surface 30 of toe portion 26 extends outwardly from bottom surface 32 at the same 15° angle. Surface 18 intercepts front surface 30 via radius R as illustrated. A detail of bottom of section 12 showing angle $\alpha$ is shown in FIG. 6.

Figure 7:
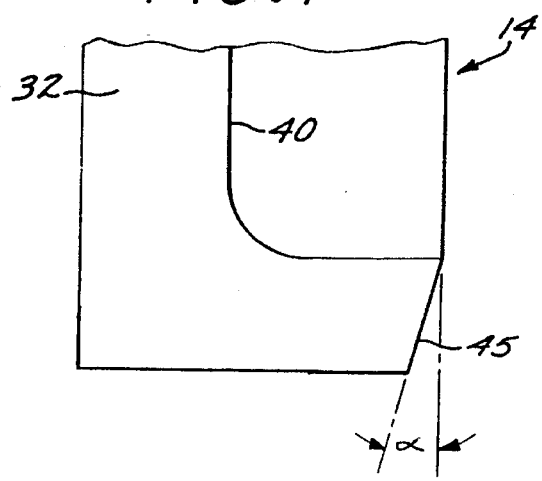
FIG. 7 is a detail of the bottom member of inner fitting 14.

Inner fitting, or corner piece, 14 as illustrated in FIG. 3 comprises a first portion 31 having an elongated surface 32 extending in a first direction and a second portion 34 extending in a second direction, the first and second directions being mutually orthogonal. Second portion 34 terminates in an edge 36 which is smaller in width than surface 32 as illustrated. A radius $R_1$ connects one edge of surface 32 to an edge of surface 36 to form a smooth, curved corner portion 40. The bottom toe portions 42 and 43 of inner fitting 14 extend inwardly at the same angle $\alpha$ as that described with reference to wall section 12 (preferably 15 degrees) from surfaces 32 and 36 to and intersect at edge 45. A detail illustrating the bottom of inner fitting 14 is shown in FIG. 7.

Figure 8:
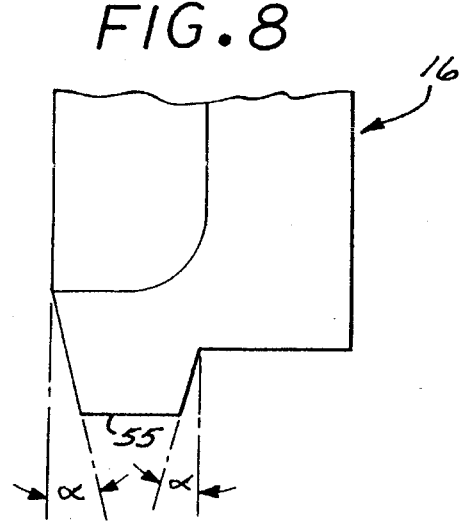
FIG. 8 is a detail of the bottom member of walls section 16.

Section 16 comprises a member 50 having a first and second longitudinally extending portions 52 and 54 joined by a ledge or step portion 53. The dimensions of portion 52 and the height of the riser between surface portion 52 and the surface of stepped portion 54 are selected so that surface 33 of portion 14 fits to form a smooth, continuous inner curved surface and mating outer surfaces as shown in FIG. 1. In addition, the overlapping surfaces of inner fitting 14 and wall section 16 provides additional stability to the overall coved backsplash system. It should further be noted that sections 12 and 14 could be sold as individual pieces or joined together; in the latter case, the overlap provides a simple installation technique for locking the joined pieces to section 16. The bottom toe portion of section 16 is identical to the toe portion of section 12 (see the detail shown in FIG. 8) as described hereinabove and is coupled to surface 54 by radius $R_2$. It should be noted that the configuration of the toe (foot) portions of each section is important in that it is self-aligning while providing a substantially 90 degree angle between the sections and the deck portion 60. In addition, the toe configuration provides a better installation fit, in turn requiring less clamping action.

The bottom (toe) portions of sections 12 and 16 and inner fitting 14 are all similarly shaped to fit into corresponding mating recesses in the deck 60.

Figure 5:
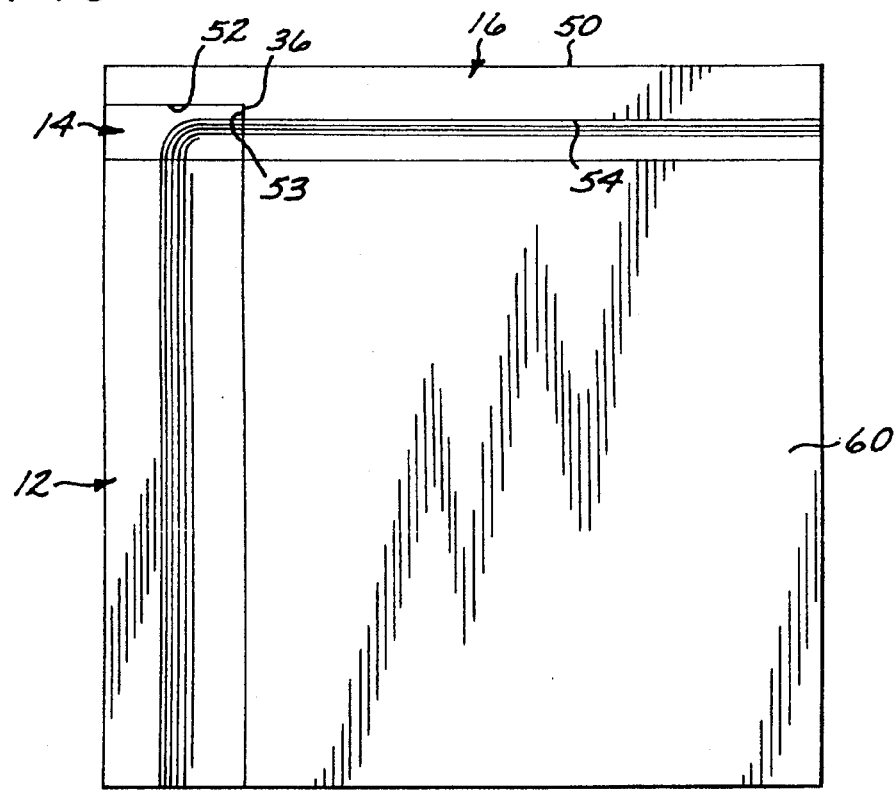
FIG. 5 is a plan view of the assembled coved backsplash system of the present invention.

The countertop installation is as follows: a recessed slot corresponding to the configuration of the toe portions of sections 12 and 16 and inner fitting 14 is formed in deck 60 and glue (typically E.I. DuPont Corian 2-part adhesive, manufactured by E.I. DuPont Company, Wilmington, Del.), then placed therein. Glue is then applied to side 23 and the bottom of section 12, including surfaces 24 and the bottom of the portion 26, side surfaces 32 and 36 and the bottom surface 45 of inner fitting 14 and the bottom surface 55 and side surface 52 of section 16. Thereafter, the toe portion of section 12 is inserted in the corresponding recess in deck 60 and a block or clamp is positioned on edge 20; the toe portion of inner fitting 14 is inserted into the corresponding recess in deck 60 and a block is positioned on the top surface 31 with surface 32 of fitting 14 in contact with edge 23 of section 12, and the toe portion of section 16 is then positioned in the corresponding recess of deck 60 and a block placed on the top edge surface 50. The surface of ledge portion 53 is in contact with edge 36 of fitting 14 as illustrated in FIG. 5.

When the components of the backsplash have been secured to deck 60, the blocks are removed and the installation is complete, subject to final finishing procedures.

Any solid surface material can be utilized to fabricate the system components. A preferred material is DuPont Corian, manufactured by E.I. DuPont Company, Wilmington, Del.

The present invention thus provides a coved backsplash which is structurally sounder and more aesthetically pleasing than prior art backsplash systems and wherein the installation time is significantly reduced, which in turn reduces the overall installation cost.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A coved backsplash system comprising:

a first wall section having first and second parallel surfaces extending in the vertical direction;

a corner piece having first and second elongated parallel surfaces, a first portion of a third surface joining a first edge of said first and second elongated parallel surfaces, said first portion of said third surface being substantially at right angles to said first and second elongated parallel surfaces, a second portion of said third surface terminating in an elongated surface substantially parallel to said first and second surfaces, and a curved surface joining a second edge of said first elongated surface to said first edge of said elongated surface and parallel to the second edge of said second surface;

a second wall section extending in the vertical direction having first and second longitudinally extending portions of differing thickness, said second longitudinally extending portion having a first surface extending in the vertical direction, a step joining said first and second portions; and a deck member having surface recesses to receive said first and second wall portions and said corner piece.

2. The system of claim 1 wherein said first and second wall sections and said corner piece each have shaped members formed at their bottom surface, said shaped members being secured in the corresponding recesses of said deck member.

3. The system of claim 2 wherein the shaped bottom members of said first and second wall sections comprise a protrusion extending from the bottom surface and having first and second longitudinally extending surfaces, said longitudinally surfaces forming an angle with the vertical direction.

4. The system of claim 3 wherein a curved surface joins said second parallel surface of said first wall section and said first longitudinally extending surface of said shaped bottom member thereof.

5. The system of claim 4 wherein a curved surface joins said first vertically extending surface of said second wall section and said first longitudinally extending surface of said shaped bottom member thereof.

6. The system of claim 5 wherein the shaped bottom member of said second longitudinally extending portion comprises an angled protrusion.

7. The system of claim 6 wherein a curved surface joins the surface of said second longitudinally extending portion of said second wall section and said first longitudinally extending surface of the shaped bottom member thereof.

* * * * *